United States Patent [19]

Armellini

[11] Patent Number: 5,536,541
[45] Date of Patent: Jul. 16, 1996

[54] ARTIFICIAL LUMBER AND METHOD OF MAKING THE SAME

[76] Inventor: Toby J. Armellini, 11151 S. Sandusky, Tulsa, Okla. 74137

[21] Appl. No.: 253,147

[22] Filed: Jun. 2, 1994

[51] Int. Cl.⁶ ..................................................... B32B 9/00
[52] U.S. Cl. ................ 428/33; 428/36.9; 428/48; 428/88; 428/122; 428/131; 428/134; 428/178; 52/210; 52/284; 52/309.7; 52/578; 52/648; 52/654
[58] Field of Search ..................... 428/212, 178, 428/192, 120, 99, 58, 56, 52, 53, 48, 44, 33, 88, 122, 131, 134, 188, 36.9; 52/210, 284, 309.7, 578, 648, 654

[56] References Cited

U.S. PATENT DOCUMENTS

| | | | |
|---|---|---|---|
| 3,019,483 | 5/1959 | Schultheiss | 18/12 |
| 3,671,355 | 6/1972 | Paymal | 156/324 |
| 3,935,047 | 1/1976 | Shinomura | 156/163 |
| 4,045,603 | 8/1977 | Smith | 428/903.3 |
| 4,304,622 | 12/1981 | Krumm | 156/243 |
| 4,514,950 | 5/1985 | Goodson, Jr. | 52/648 |
| 4,813,193 | 3/1989 | Aptizer | 52/210 |
| 4,906,508 | 3/1990 | Blankenburg et al. | 428/116 |
| 5,196,255 | 3/1993 | Cohen | 428/188 |
| 5,242,735 | 9/1993 | Blankenburg et al. | 428/116 |

*Primary Examiner*—Patrick J. Ryan
*Assistant Examiner*—Abraham Bahta
*Attorney, Agent, or Firm*—Dougherty, Hessin, Beavers & Gilbert

[57] ABSTRACT

Artificial lumber module which may be joined with like modules to create artificial lumber of conventional lumber sizes includes an elongate channel; a plurality of dividers integrally formed within the channel and spaced along the channel; and braces integrally formed with and between adjacent dividers. A plurality of the modules may be connected together substantially in parallel with the open side of the channels facing the closed side of adjacent channels in order to form modular lumber of selected sizes.

8 Claims, 3 Drawing Sheets

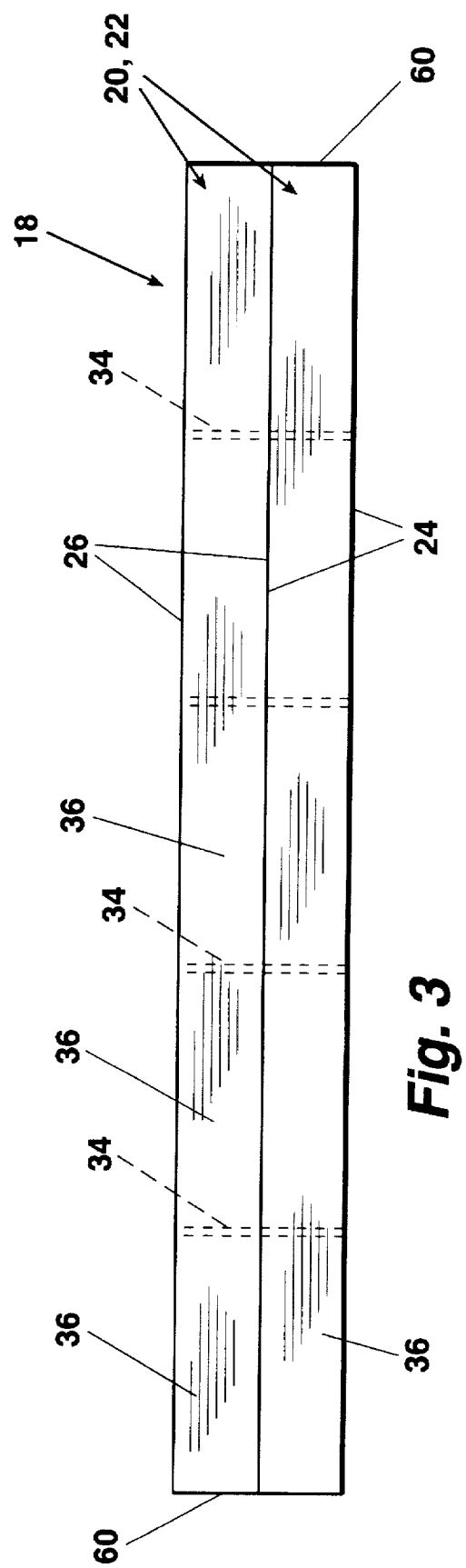
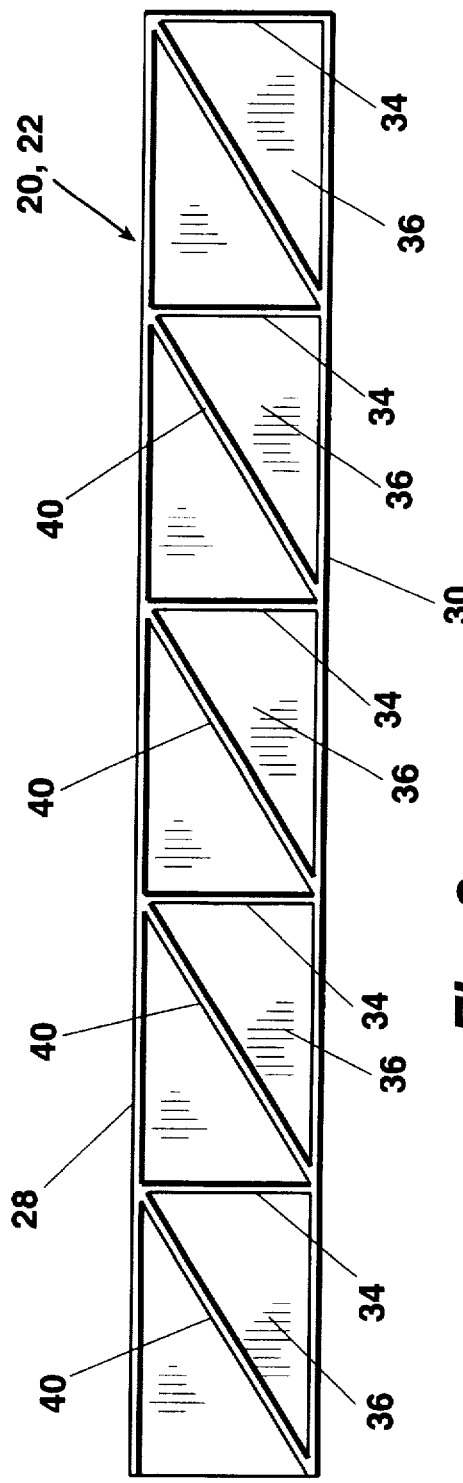

ARTIFICIAL LUMBER AND METHOD OF MAKING THE SAME

BACKGROUND OF THE INVENTION

This invention relates to construction materials and more particularly, but not by way of limitation, to modular artificial lumber and methods of making the same.

A variety of apparatus and method for producing synthetic wood have been developed and used. Generally, these apparatus provide for producing sheets, panels, or slabs of synthetic building material. U.S. Pat. No. 5,196,255 (Cohen) discloses extruded plastic slats having multiple series of longitudinal cavities in a side-by-side relationship. The slabs are light in weight and the longitudinal cavities are disclosed as being adaptable to receive a rod for reinforcing purposes. U.S. Pat. No. 3,019,483 (Schultheiss) discloses method and apparatus which uses a multiplicity of strips of plastic material for producing a structural board having a multiplicity of substantially parallel rib-forming streams of plastic material. Neither Cohen nor Schultheiss discloses or suggests artificial lumber modules and methods of making such modules used to produce load-bearing artificial lumber, i.e., artificial lumber which may replace conventional load-bearing wood lumber such as the two-by-fours, two-by-sixes, two-by-eights, and other graded lumbers used in housing construction. Neither Cohen nor Schultheiss disclose or suggest artificial lumber modules or methods of making such modules in which the modules are integrally molded, may be combined without modification to create artificial lumber of conventional sizes, or which provide the structural strength of conventional wood in an integrally formed module.

There is a need for modular lumber and methods of making the same which may be used to produce conventional load-bearing lumber from moldable materials and thereby decrease the amount of natural wood required in the building industry and preserving our forests and environment. There is a need for modular lumber and methods which provide an artificial lumber module sized so that a whole number of substantially identical modules may be joined to create artificial lumber of selected conventional lumber sizes. There is a need for modular lumber made of integrally molded modules which have the structural strength of conventional wood without the addition of non-integral reinforcements.

SUMMARY OF THE INVENTION

The present invention is contemplated to overcome the foregoing deficiencies and meet the above-described needs. In accomplishing this, the present invention provides novel and improved artificial lumber modules and methods for making the same.

The invention includes an elongate channel having an open side, a closed side, two closed edges, and a longitudinal axis. A plurality of dividers are spaced along the longitudinal axis and connected in the channel. A brace is connected between each adjacent pair of dividers. A plurality of the lumber modules may be connected together substantially in parallel with the open sides of the channels facing the closed side of adjacent channels in order to produce artificial lumber of conventional sizes.

It is an advantage of the present invention to provide artificial lumber modules and methods of making such modules which may be combined to create load-bearing artificial lumber and to replace conventional load-bearing wood lumber.

It is an advantage of the present invention to allow the use of one size of artificial lumber module and one size of mold to fabricate multiple conventional sizes of graded wooden lumber.

It is an advantage of the present invention to allow the use of a standard size mold for creating modular lumber of various selected sizes.

BRIEF DESCRIPTION OF THE DRAWINGS

The present invention will be better understood by reference to the example of the following drawings:

FIG. 2 is a view of the open side of an embodiment of the artificial lumber of the present invention.

FIG. 3 is a top view of FIG. 2.

DETAILED DESCRIPTION OF THE PREFERRED EMBODIMENTS

Figure 1:
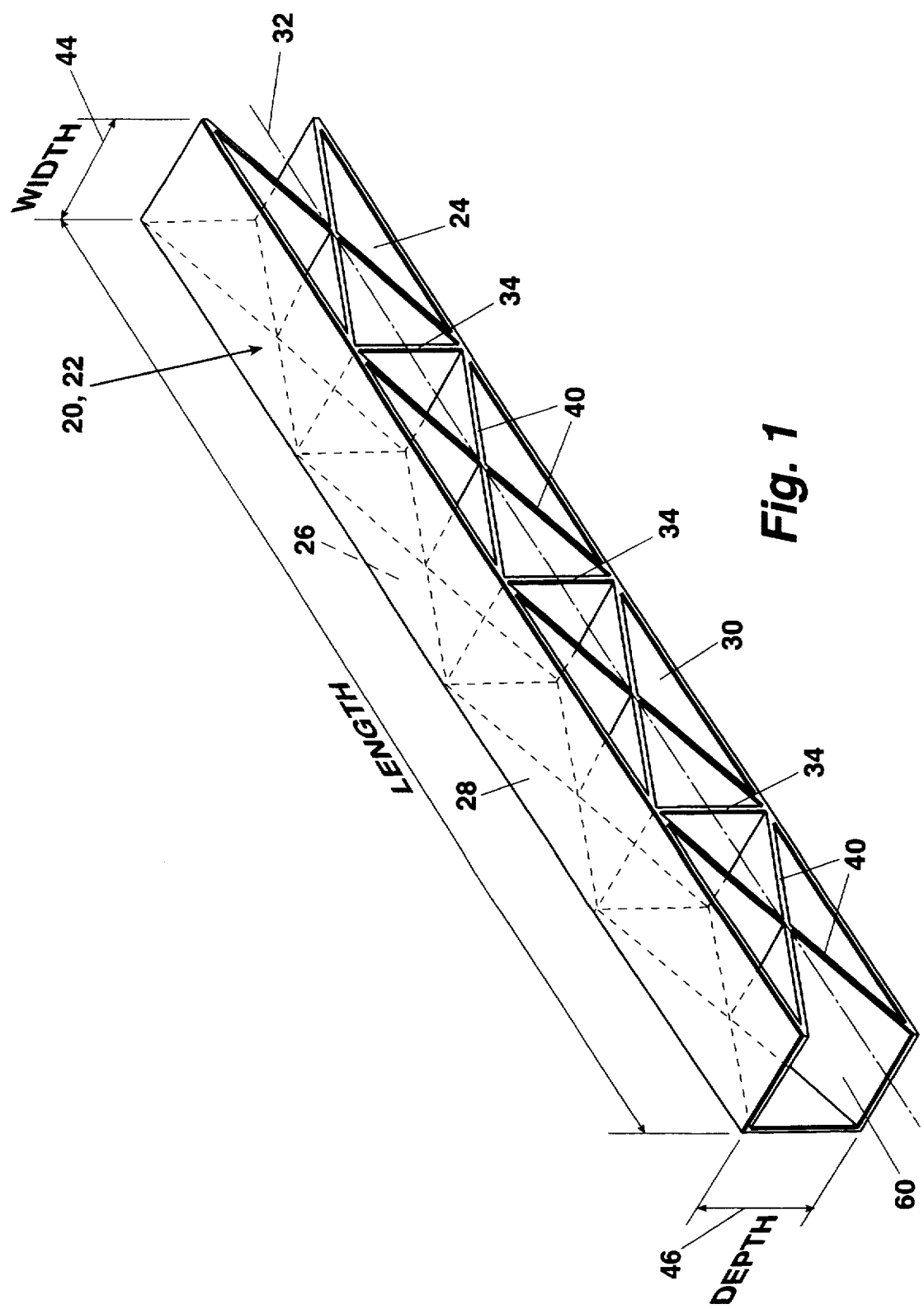
FIG. 1 is a perspective view of an embodiment of an artificial lumber module of the present invention.

Preferred embodiments of the present invention will now be described with reference to the drawings. Like reference characters refer to like or corresponding parts throughout the drawings and description.

FIGS. 1–4 present embodiments of the artificial lumber and method of making artificial lumber, generally designated 18, of the present invention. Although a preferred embodiment of the invention, described herein to facilitate an enabling understanding of the invention, is used in conjunction with conventional sizes of load-bearing, graded lumber used in the United States, such as 2 inch by 4 inch, 2 inch by 6 inch, and 2 inch by 8 inch structural members, etc.

Referring to the example of FIG. 1, the artificial lumber module 20 may be generally described as including an elongate channel 22 having an open side 24, a closed side 26, two closed edges 28, 30, and a longitudinal axis 32. The channel 22 is preferably rectangular or square in transverse cross-section. The preferred channel 22 surrounds or encloses the longitudinal axis 32 (excepting on the open side 24) and is rectangular in cross-sectional shape, as best seen in FIG. 1. A plurality of dividers 34 are spaced along the longitudinal axis 32 and connected in the channel 22. Preferably, the dividers 34 are evenly spaced along the longitudinal axis 32 of the channel 22. Preferably, the dividers are substantially perpendicular to the axis 32. The preferred dividers 34 divide the channel 22 into a series of compartments 36 (FIGS. 2 and 3), each compartment 36 sharing a divider 34 as an end wall. It is contemplated that a perpendicular orientation of the dividers 34 will provide the channel 22 with maximum structural strength.

A brace 40 is connected between adjacent dividers 34. Preferably, a brace 40 is provided between each pair of adjacent dividers 34. In the prototype module 20, each brace 40 is connected diagonally across the space between adjacent dividers 34 (FIG. 2). The brace 40 provides additional rigidity and structural strength to the lumber module 20. To further strengthen the module 20, two braces 40 may be connected diagonally between adjacent dividers 34 so as to form a cross-brace, as best seen in FIG. 1.

Referring to the example of FIG. 3, a plurality of modules 20 are connected together substantially in parallel to create modular lumber 18 of selected sizes. Preferably, the modules 20 are connected together substantially in parallel with the open side 24 of the channels 22 facing the closed side 26 of the adjacent channels 22. The external dimensions of the channel 22 are sized so that multiple channels 22 join together to form lumber 18 of conventional sizes. For example, using the nominal sizes currently used in the U.S. lumber industry for purposes of description, in making conventional load-bearing, two inch by four inch (two-by-fours), two inch by eight inch (two-by-eights), etc., graded lumber, the width 44 of the module 20 would nominally be two inches and the depth 46 would nominally be two inches. Therefore, two modules 20 would be used to create a two-by-four of modular lumber, three modules 20 would be used to create a two-by-six of modular lumber 18, and so on. Consequently, one size of module 20 may be used to create modular lumber 18 in multiple sizes. The dimensions may be altered to suit special applications and industry specifications, as would be known to one skilled in the art in view of the disclosure contained herein. For example, it is known that conventional load-bearing lumber deviates from its nominal sizes. For example, two-by-fours actually measure approximately 1¾ inches by 3½ inches; two-by-sixes actually measure approximately 1¾ inches by 5½ inches; two-by-eights actually measure approximately 1¾ inches by 7½ inches; two-by-tens actually measure approximately 1¾ inches by 9½ inches, etc. Therefore, if it is desirable to create modular lumber 18 of exactly the same dimensions as conventional load-bearing lumber, the width 44 of the module 20 could be made to be ½ inch and the depth 46 could be 1¾ inches; or the modular lumber 18 could be assembled using one module having a width 44 of 1½ inches and a depth 46 of 1¾ inches with the remainder of the modules 20 having a width of 2 inches and a depth of 1¾ inches In the preferred module 20, the channel 22, dividers 34, and braces 40 are integrally formed, thereby forming a unitary, one-piece module 20. The modules 20 may be molded in fixed lengths and joined in fixed lengths to create modular lumber 18 of selected fixed length. As will be discussed below, the modules 20 may also be molded continuously and modules 20 of desired length may be cut from the continuously molded module 20. As will also be discussed, the continuously molded modules 20 may be joined in a continuous joining process before being cut into selected lengths.

Referring to the example of FIGS. 1–3, the method of making artificial lumber 18 and lumber modules 20 includes forming an elongate channel 22 having an open side 24, a closed side 26, two closed edges 28, 30, and a longitudinal axis 32; spacing a plurality of dividers 34 in the channel 22 along the longitudinal axis 32; and connecting a brace 40 between adjacent dividers 34. Referring to example FIG. 3, the method further provides for connecting a plurality of channels 22 or modules 20 substantially in parallel. Preferably, the modules 20 are connected with the open side 24 of the channels 22 facing the closed side 26 of the adjacent channels 22. In the preferred method, the channel 22, dividers 34, and braces 40 of each module 20 are integrally formed.

The method further provides for continuously forming the channel 22 and module 20. The method provides for continuously joining a plurality of channels 22 with the open side 24 of the channels 22 facing the closed side 26 of the adjoining channel 22. The method also provides for continuously and simultaneously forming a plurality of channels 22 or modules 20 and continuously joining the simultaneously formed channels 22 in order to form modular lumber of selected sizes.

The method provides for sizing the external dimensions of the channel 22 so that multiple channels 22 or modules 20 join to form lumber 18 of conventional sizes, as well as any other selected specifications.

The method provides for connecting the braces 40 diagonally between adjacent dividers 34 as well as for connecting two braces 40 diagonally between adjacent dividers 34 and forming a crossbrace. Preferably, the dividers 34 are substantially perpendicular to the longitudinal axis 32.

Figure 4:
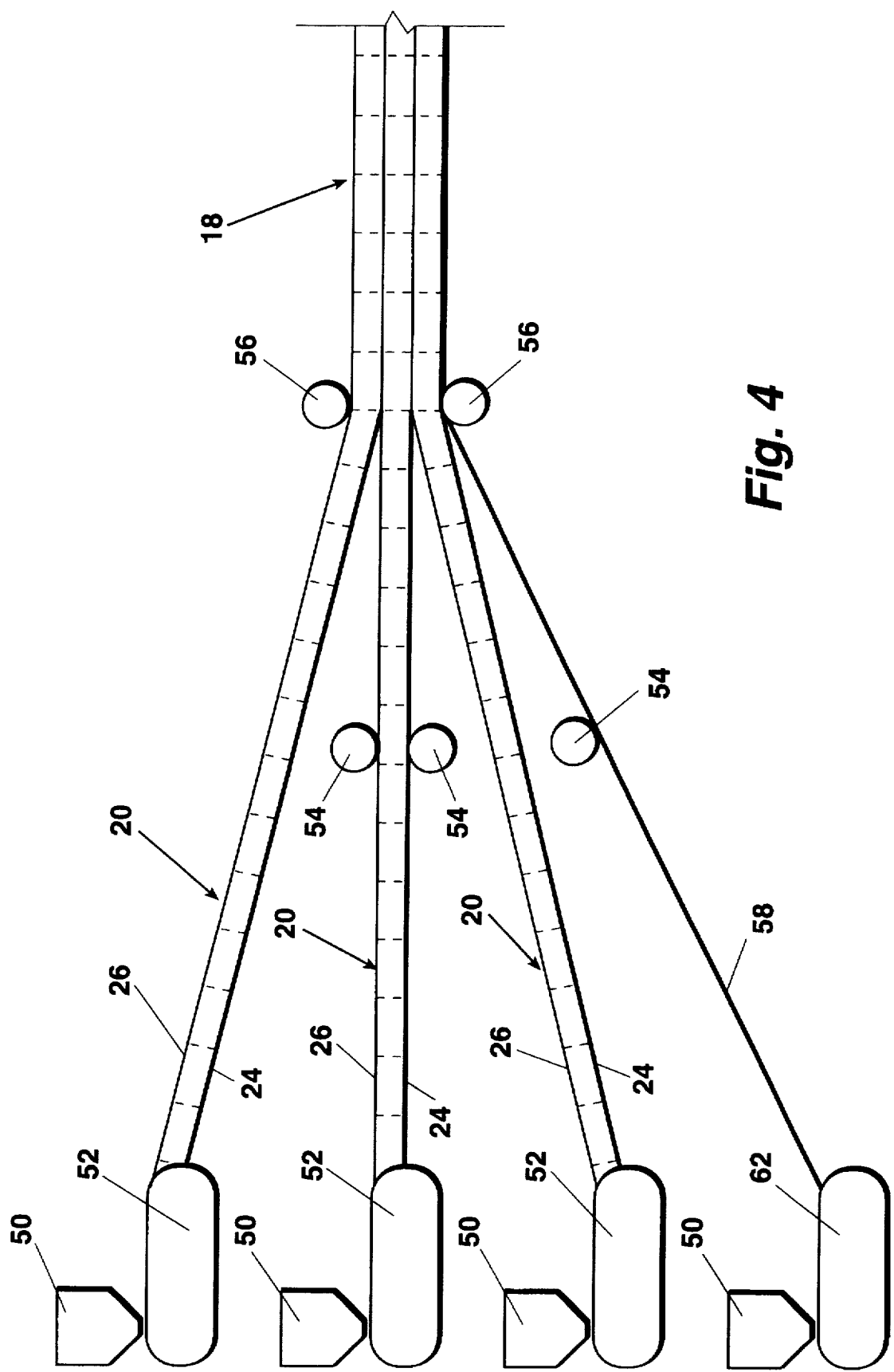
FIG. 4 is a schematic diagram of an embodiment of a method of making the artificial lumber of the present invention.

FIG. 4 schematically exemplifies both the continuous molding of the modules 20 and the continuous joining of the modules 20 to create modular lumber 18. In FIG. 4, four material sources 50, such as injectors, place a moldable material into continuous molds 52, 62. The material may be any moldable material compatible with the continuous molds 52, 62, such as recycled or new polymers, plastics, and other materials, as would be known to one skilled in the art in view of the disclosure contained herein. It is contemplated that an injection molding process will provide the best results. It is also contemplated that the process may be adapted for use with castable materials, such as cement. The words form, formable, forming, formed, etc. as used herein are intended to include all methods of producing an integral module 20, such as the molding and casting methods discussed above.

In the example of FIG. 4, three continuous molds 52 are used to create three continuous modules 20. The modules 20 may be connected together using appropriate chemical bonding or heat fusion, depending upon the materials of construction, as would be known to one skilled in the art in view of the disclosure contained herein. In the example of FIG. 4, bonding medium applicators 54 provide appropriate thermal or chemical bonding treatment to at least one of the modules 20. Pinch rollers 56 press the continuously molded modules 20 together to form the modular lumber 18 as would be apparent to one skilled in the art in view of the disclosure contained herein. The appropriate number of continuous molds may be provided to continuously form modular lumber 18 of selected sizes. As the continuous modular lumber 18 leaves the pinch rollers 56, it may be cut into desired lengths as appropriate for storage, transportation, or construction requirements.

FIG. 4 also exemplifies the addition of a sealing strip 58 to seal the open side 24 of the outermost module 20 of the modular lumber 18. The strip 58 may be continuously formed by mold 62 or may be preformed, extruded, or the like. After the modular lumber 18 is cut, a sealing strip (not illustrated) may also be provided to seal any open ends 60 (best seen in FIG. 3) of the cut modular lumber 18 (if the module 20 is not cut or formed to provide dividers 34 at both ends of the module 20). Although the adjoined modules 20 may be positioned with the dividers 34 of the modules 20 out of transverse alignment (in which case sealing strips may be provided at both ends 60 of the modular lumber 18 if it is desired to seal the ends 60), preferably the dividers 34 will be transversely aligned (as exemplified in FIG. 3) so that the modules 20 may be joined (if of fixed length) or cut (if of continuous length or otherwise necessary) with the dividers 34 at one or both ends of the modules 20 aligned so as to seal the end of the artificial lumber 18 and eliminate the need for a sealing strip at one or both ends of the lumber 18.

Referring to the example of FIGS. 1–3, in the prototype module 20, the dividers 34 form sealed compartments in the channel 22 which are of the same depth as the channel 22. The braces 40 are also integrally formed with the closed side 26 and dividers 34 and therefore subdivide the compartments 36 into smaller compartments which are sealed except for the open side 24. The thickness of the closed side 26, ends 28, 30, dividers 34, and braces 40 will be determined by the desired strength of the module 20 and modular lumber 18. The dividers 34 and braces 40 are about the same width 44, and preferably are the same width 44, as the interior width of channel 22 so that the free ends of the dividers 34 and braces 40 are about flush, and preferably are flush, with the open side 24 of the channel 22. Preferably, the thickness of the closed side 26 and ends 28, 30 as well as the sizing, spacing, and arrangement of the dividers 34 and braces 40 will be selected to provide the artificial lumber 18 with approximately the same strength as conventional wood lumber of the same size.

While presently preferred embodiments of the invention have been described herein for the purpose of disclosure, numerous changes in the construction and arrangement of parts and the performance of steps will suggest themselves to those skilled in the art in view of the disclosure contained herein, which changes are encompassed within the spirit of this invention, as defined by the following claims.

What is claimed is:

1. Artificial lumber module for making load-bearing artificial lumber in the sizes of conventional, graded wooden lumber, comprising:

an elongate channel having an open side, a closed side, two closed edges, and a longitudinal axis, the distance between the sides defining the width and the distance between the edges defining the depth of the module;

a plurality of dividers spaced along the longitudinal axis and connected in the channel; and a brace connected between adjacent dividers; and wherein the width and depth of the module are selected so that a whole number of modules may be connected together substantially in parallel with the open sides of the channels facing the closed sides of adjacent channels in order to fabricate artificial load-bearing lumber in the sizes of conventional, graded wooden lumber.

2. Lumber module of claim 1:

wherein the channel, dividers, and braces are integrally molded.

3. Lumber module of claim 1, comprising:

a plurality of modules connected together substantially in parallel with the open sides of the channels facing the closed sides of adjacent channels.

4. Lumber module of claim 1:

wherein each brace is connected diagonally across the space between adjacent dividers.

5. Lumber module of claim 4, comprising:

two braces connected diagonally between adjacent dividers so as to form a cross-brace.

6. Artificial lumber module which may be joined with like modules to create artificial lumber of conventional lumber sizes, comprising:

an elongate channel having an open side, a closed side, two closed edges, and a longitudinal axis, the distance between the sides defining the width and the distance between the edges defining the depth of the module;

a plurality of dividers integrally formed within the channel and spaced along the channel; and a brace integrally formed with and between adjacent dividers; and wherein the width and depth of the module are selected so that a whole number of modules may be connected together substantially in parallel with the open sides of the channels facing the closed sides of adjacent channels in order to fabricate artificial load-bearing lumber in the sizes of conventional, graded wooden lumber.

7. Module of claim 6, comprising:

a plurality of modules connected together substantially in parallel with the open sides of the channels facing the closed sides of adjacent channels.

8. Module of claim 6:

wherein the module is sized so that a whole number of identical modules may be joined to create artificial lumber of selected conventional lumber sizes.

* * * * *